United States Patent
Asai

(10) Patent No.: US 9,958,287 B2
(45) Date of Patent: May 1, 2018

(54) MAP DISPLAY SYSTEM AND MAP DISPLAY METHOD

(71) Applicant: MITSUBISHI ELECTRIC CORPORATION, Tokyo (JP)

(72) Inventor: Masafumi Asai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 15/309,756

(22) PCT Filed: Jul. 18, 2014

(86) PCT No.: PCT/JP2014/069139
§ 371 (c)(1),
(2) Date: Nov. 8, 2016

(87) PCT Pub. No.: WO2016/009550
PCT Pub. Date: Jan. 21, 2016

(65) Prior Publication Data
US 2017/0261333 A1  Sep. 14, 2017

(51) Int. Cl.
*G01C 21/36* (2006.01)
*G06T 17/05* (2011.01)
(Continued)

(52) U.S. Cl.
CPC ....... *G01C 21/3638* (2013.01); *G01C 21/367* (2013.01); *G01C 21/3635* (2013.01);
(Continued)

(58) Field of Classification Search
CPC ............ G01C 21/3638; G01C 21/3661; G01C 21/367; G01C 21/3673; G06T 15/20; G06T 17/05
(Continued)

(56) References Cited

U.S. PATENT DOCUMENTS

| 6,175,802 B1 | 1/2001 | Okude et al. |
| 6,341,254 B1 | 1/2002 | Okude et al. |

(Continued)

FOREIGN PATENT DOCUMENTS

| JP | 9-230783 A | 9/1997 |
| JP | 10-143066 A | 5/1998 |

(Continued)

*Primary Examiner* — Tyler J Lee
(74) *Attorney, Agent, or Firm* — Birch, Stewart, Kolasch & Birch, LLP

(57) ABSTRACT

Based on map information acquired from a map DB, a viewpoint for viewing a ground surface on a map of a set region at a time of displaying the map is set. Altitude information that indicates an altitude of a landform present in at least a partial region of the set region is stored. In a case where the altitude information is present in the map DB at a position on the map, which is set in response to a position indicated by inputted position information, a sight direction of the viewpoint is changed, and the viewpoint is thereby set at a position higher than the altitude of the landform, which is indicated by altitude information of the position on the map. A display data for displaying, on a display device, a map in a case of viewing the ground surface from the viewpoint set is generated.

9 Claims, 7 Drawing Sheets

(51) Int. Cl.
   *G06T 15/20*       (2011.01)
   *G09B 29/00*       (2006.01)
(52) U.S. Cl.
   CPC ..... *G01C 21/3661* (2013.01); *G01C 21/3673* (2013.01); *G06T 15/20* (2013.01); *G06T 17/05* (2013.01); *G09B 29/005* (2013.01)
(58) Field of Classification Search
   USPC .................................................. 701/400, 436
   See application file for complete search history.

(56) References Cited

U.S. PATENT DOCUMENTS

| | | | |
   |---|---|---|---|
   | 6,388,664 B2 | 5/2002 | Sone | |
   | 6,448,969 B1 * | 9/2002 | Minakawa | ......... G01C 21/3635 345/421 |
   | 6,714,861 B2 | 3/2004 | Okude et al. | |
   | 6,867,784 B2 * | 3/2005 | Ebisch, Jr. | ........... G09B 29/006 345/441 |
   | 7,101,283 B2 | 9/2006 | Okamoto et al. | |
   | 8,120,615 B2 * | 2/2012 | Gannon | ................. G06T 17/05 342/65 |
   | 9,500,496 B2 * | 11/2016 | Kogler | ............... G01C 21/3635 |

FOREIGN PATENT DOCUMENTS

| | | |
   |---|---|---|
   | JP | 2000-161969 A | 6/2000 |
   | JP | 2001-276420 A | 10/2001 |
   | JP | 2002-181562 A | 6/2002 |
   | JP | 2004-381112 A | 12/2004 |
   | JP | 2005-326358 A | 11/2005 |
   | JP | 2008-145680 A | 6/2006 |
   | JP | 2006-235075 A | 9/2006 |
   | JP | 2008-14754 A | 1/2008 |

* cited by examiner

F I G . 1
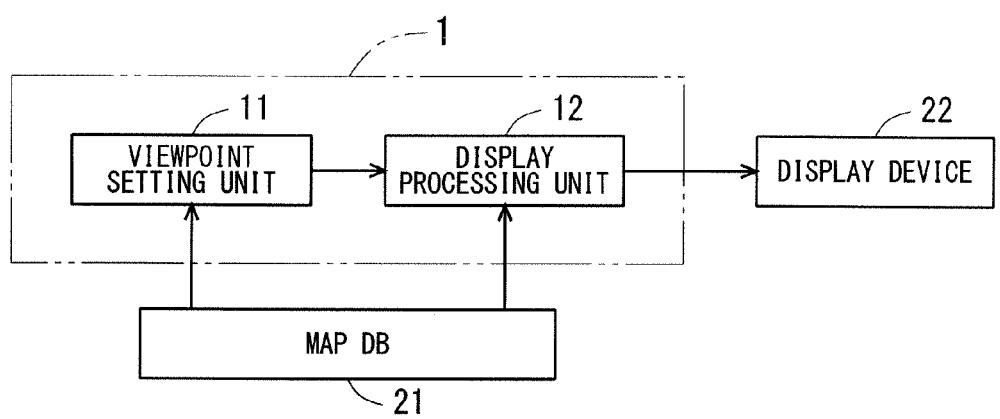

F I G . 5
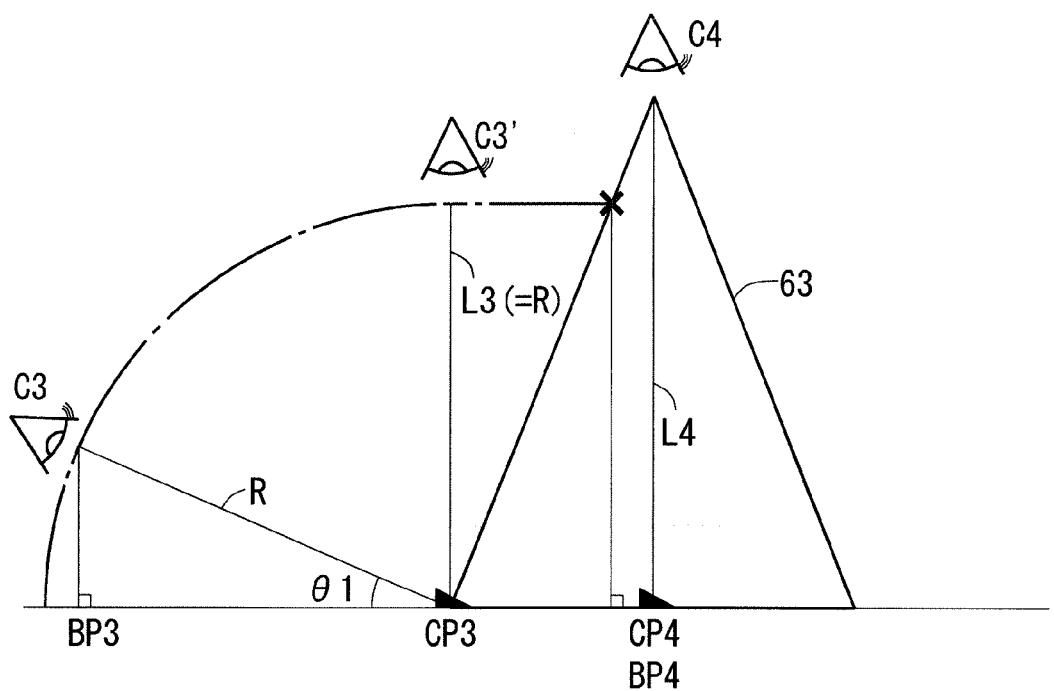

MAP DISPLAY SYSTEM AND MAP DISPLAY METHOD

TECHNICAL FIELD

The present invention relates to a map display system and a map display method.

BACKGROUND ART

On a map drawn three-dimensionally, symbols which represent landforms such as mountains, vehicles and the like are drawn with polygonal map constituents such as polygons. A navigation device uses a display method of displaying a polygon (hereinafter, referred to as an "own-vehicle polygon" in some case), which represents a vehicle (hereinafter, referred to as an "own vehicle" in some case) on which the same device is mounted, in a mode of looking down from a viewpoint located at a high position rear of the own-vehicle polygon.

In this display method, there is a problem that the own-vehicle polygon is hidden by a polygon (hereinafter, referred to as a "landform polygon" in some case), which represents a landform higher than the position of the viewpoint, for example, a mountain, when the own vehicle passes through a tunnel or the like, which is formed in the mountain.

Technologies for avoiding the problem in the prior art are disclosed, for example, in Patent Documents 1 to 5. For example, in a technology disclosed in Patent Document 1, the problem in the prior art is avoided by using means for setting an altitude of the viewpoint to a place higher than an altitude of such a constituent of the map.

PRIOR ART DOCUMENTS

Patent Documents

Patent Document 1: Japanese Patent Application Laid-Open No. H10-143066 (1998)
Patent Document 2: Japanese Patent Application Laid-Open No. 2006-145680
Patent Document 3: Japanese Patent Application Laid-Open No. 2002-181562
Patent Document 4: Japanese Patent Application Laid-Open No. 2008-14754
Patent Document 5: Japanese Patent Application Laid-Open No. 2004-361112

SUMMARY OF INVENTION

Problems to be Solved by the Invention

The technologies disclosed in Patent Documents 1 to 5 mentioned above are premised on that the own vehicle is running on a surface of the landform, and do not consider a position of the viewpoint at a time of tunnel running.

Hence, in a case where the own vehicle passes through the tunnel or the like, which is formed in such a landform as a mountain higher than the position of the viewpoint, then there occurs a problem that the viewpoint enters a landform polygon representing the mountain or the like, and an unnecessary image in an inside of the landform polygon is displayed, resulting in an appearance deterioration of the map.

It is an object of the present invention to provide a map display system and a map display method, which are capable of preventing the display of the unnecessary image in the inside of the map constituent that represents the landform on the map, and capable of displaying a map with a good appearance.

Means for Solving the Problems

A map display system of the present invention includes: a processor to execute a program; and a memory to store the program which, when executed by the processor, results in performance of steps comprising, acquiring from a map database, map information of a set region set in response to a position indicated by inputted position information, setting, based on the acquired map information, a viewpoint of viewing a ground surface on a map of the set region at a time of displaying the map, and a generating display data for displaying, on a display device, a map of the set region in a case of viewing the ground surface from the viewpoint set in the setting, and is characterized in that the map database stores altitude information indicating an altitude of a landform present in at least a partial region of the set region, and in the setting, in a case where the altitude information is present in the map database at a position on the map, the position being set in response to the position indicated by the inputted position information, a sight direction of the viewpoint is changed, and the viewpoint is thereby set at a position higher than the altitude of the landform, the altitude being indicated by the altitude information at the position on the map.

A map display method of the present invention includes the steps of acquiring, from a map database, map information of a set region set in response to a position indicated by inputted position information, and based on the acquired map information, setting a viewpoint of viewing a ground surface on a map of the set region at a time of displaying the map, and generating display data for displaying, on a display device, a map of the set region in a case of viewing the ground surface from the set viewpoint, and is characterized in that, in the map database, altitude information indicating an altitude of a landform present in at least a partial region of the set region is stored, and in a case where the altitude information is present in the map database at a position on the map, the position being set in response to the position indicated by the inputted position information, a sight direction of the viewpoint is changed, and the viewpoint is thereby set at a position higher than an altitude of the landform, the altitude being indicated by the altitude information at the position on the map.

Effects of the Invention

According to the map display system of the present invention, the altitude information, which indicates the altitude of the landform present in at least the partial region of the set region set in response to the position indicated by the inputted position information, is stored in the map database. In the case where the altitude information is present in the map database at the position on the map, which is set in response to the position indicated by the inputted position information, then the sight direction of the viewpoint is changed, whereby the viewpoint is set at the position higher than the altitude of the landform, which is indicated by the altitude information of the position on the map. The display data for displaying, on the display device, the map of the set region in the case of viewing the ground surface from the set viewpoint is generated. In such a way, for example, in the case where the vehicle passes through a tunnel in the landform higher than the viewpoint position, for example, a mountain, then the viewpoint of the map including the vehicle can be prevented from entering a map constituent representing the landform such as the mountain. Hence, an unnecessary image in an inside of the map constituent representing the landform on the map can be prevented from being displayed, and accordingly, a map with a good appearance can be displayed.

According to the map display method of the present invention, the altitude information, which indicates the altitude of the landform present in at least the partial region of the set region set in response to the position indicated by the inputted position information, is stored in the map database. In the case where the altitude information is present in the map database at the position on the map, which is set in response to the position indicated by the inputted position information, then the sight direction of the viewpoint is changed, whereby the viewpoint is set at the position higher than the altitude of the landform, which is indicated by the altitude information of the position on the map. The display data for displaying, on the display device, the map of the set region in the case of viewing the ground surface from the set viewpoint is generated. In such a way, for example, in the case where the vehicle passes through a tunnel in the landform higher than the viewpoint position, for example, a mountain, then the viewpoint of the map including the vehicle can be prevented from entering a map constituent representing the mountain or the like. Hence, an unnecessary image in an inside of the map constituent representing the landform on the map can be prevented from being displayed, and accordingly, a map with a good appearance can be displayed.

Objects, features, aspects and advantages of the present invention will be clearer by the following detailed description and the accompanying drawings.

BRIEF DESCRIPTION OF DRAWINGS

FIG. 1 is a block diagram showing a configuration of a map display system 1 as a first embodiment of the present invention.

FIG. 5 is a view explaining a viewpoint position in a case where the own vehicle 60 runs through a tunnel formed in a mountain 63.

DESCRIPTION OF EMBODIMENTS

<First Embodiment>

Figure 2:
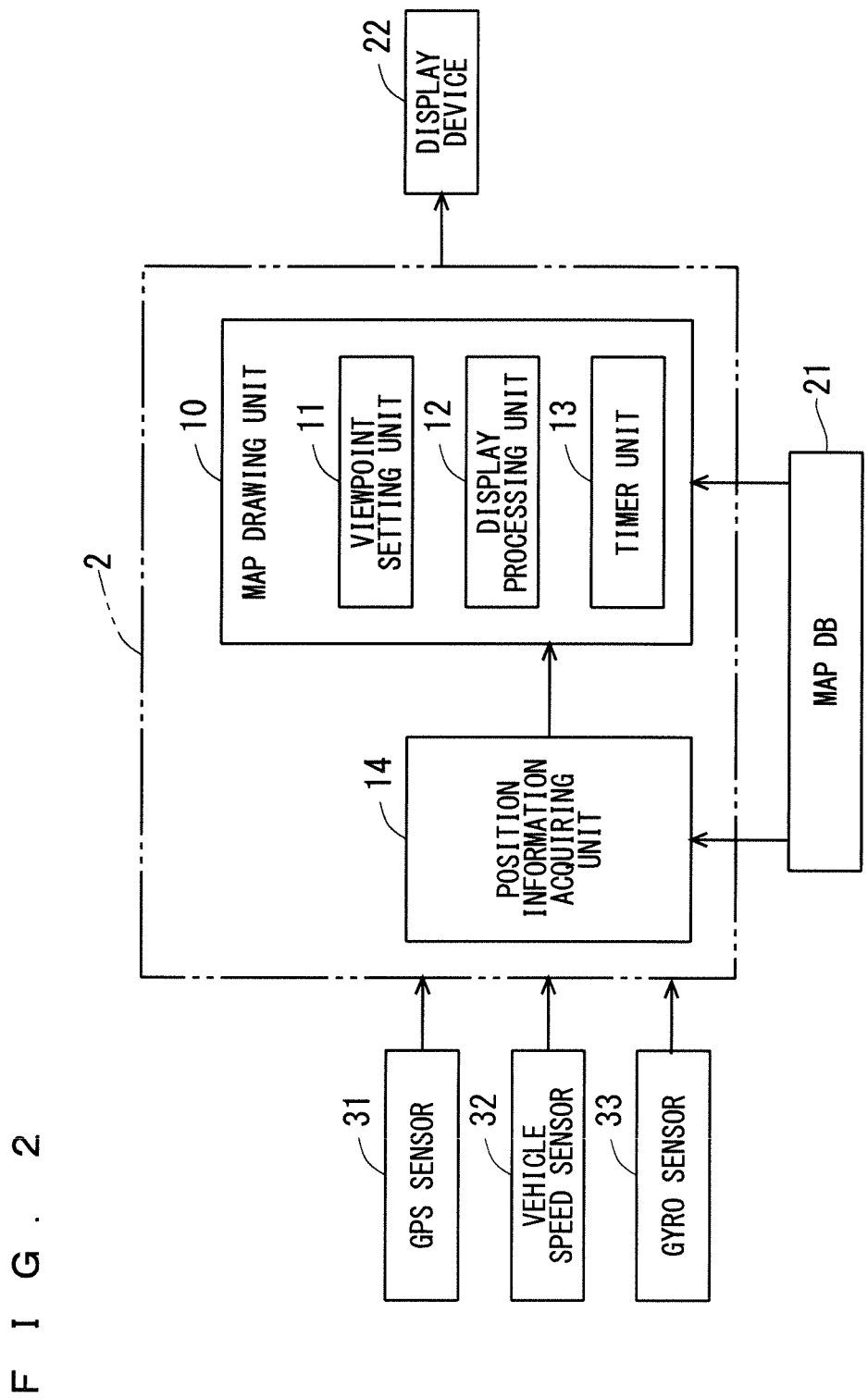
FIG. 2 is a block diagram showing a configuration of a map display system 2 as a second embodiment of the present invention.

FIG. 1 is a block diagram showing a configuration of a map display system 1 as a first embodiment of the present invention. The map display system 1 of this embodiment is realized by a navigation device mounted on a vehicle. The map display system 1 includes a viewpoint setting unit 11 and a display processing unit 12. The viewpoint setting unit 11 and the display processing unit 12 are connected to a map database (hereinafter, referred to as a "map DB" in some case) 21. The display processing unit 12 is connected to a display device 22.

For example, the map display system 1 is composed of: a central processing unit (abbreviation: CPU); and a memory such as a writable RAM (Random Access Memory). The memory stores a control program. The CPU executes the control program stored in the memory, whereby respective functions of the viewpoint setting unit 11 and display processing unit 12 of the map display system 1 are realized.

The map DB 21 is realized by a storage device, for example, such as a hard disk drive (abbreviation: HDD) and a semiconductor memory. The map DB 21 stores map information regarding a map.

The map information is configured in such a manner that a plurality of maps corresponding to predetermined scales are layered on each other. The map information includes map display information for displaying the maps as images.

The map display information includes: road attribute information regarding a road; altitude information representing an altitude of a map constituent; background information including polygon data indicating a range of a facility on the map and line data indicating a line shape of a river or the like on the map; facility information representing a type, name, position and the like of the facility; various pieces of character information representing a place name, a facility name, a crossing name, a road name and the like; and various pieces of icon information representing the facility, a road number and the like.

The altitude information is information indicating an altitude of a landform present in at least a partial region of a set region that is preset. The set region is set in response to a position indicated by position information inputted to the map display system 1.

The viewpoint setting unit 11 acquires the map information from the map DB 21, and based on the acquired map information, sets a viewpoint for viewing a ground surface on the map at a time of displaying the map. The viewpoint setting unit 11 gives viewpoint position information, which represents a position of the set viewpoint, to the display processing unit 12.

The display processing unit 12 acquires the map information from the map DB 21, and based on the acquired map information and the viewpoint position information given from the viewpoint setting unit 11, generates display data for displaying, on the display device 22, a map of a case of viewing the ground surface from the position of the viewpoint indicated by the viewpoint position information. The display processing unit 12 gives the generated display data to the display device 22.

For example, the display device 22 is realized by a liquid crystal display device. Though illustration is omitted, the display device 22 includes a display that displays an image. The display device 22 displays the map based on the display data given from the display processing unit 12. Specifically, the display device 22 converts the display data, which is given from the display processing unit 12, into an image signal handleable in the display device 22, and displays an image, which corresponds to image information represented by the obtained image signal, on a display screen of the display.

For example, the display device 22 is a display device of a portable communication device such as a cellular phone, a smart phone and a tablet-type terminal device, or a display device of a car navigation device mountable on a vehicle. The display device 22 may be provided separately from a display device of the portable communication device, the car navigation device or the like.

In this embodiment, in a case where the altitude information is present in the map DB 21 at a position on the map, which is set in response to the position indicated by the inputted position information, the viewpoint setting unit 11 changes a sight direction of the viewpoint, and thereby sets the viewpoint at a position higher than a map constituent such as a landform at the position on the map.

In such a way, for example, in a case where the vehicle passes through a tunnel in the landform higher than the viewpoint position, for example, a mountain, then the viewpoint of the map including the vehicle can be prevented from entering a polygon that is the map constituent representing the mountain or the like. Hence, an unnecessary image in an inside of the map constituent called a polygon representing the landform or the like can be prevented from being displayed, and accordingly, a map with a good appearance can be displayed on the display device 22.

<Second Embodiment>

FIG. 2 is a block diagram showing a configuration of a map display system 2 as a second embodiment of the present invention. The map display system 2 includes a map drawing unit 10 and a position information acquiring unit 14. The map drawing unit 10 includes a viewpoint setting unit 11, a display processing unit 12, and a timer unit 13. A map DB 21 is connected to the map drawing unit 10 and the position information acquiring unit 14. Moreover, to the map display system 2, there are connected a global positioning system (abbreviation: GPS) sensor 31, a vehicle speed sensor 32, a gyro sensor 33, and a display device 22.

The viewpoint setting unit 11 and display processing unit 12 of the map drawing unit 10, the DB 21 and the display device 22 in this embodiment have the same configurations as those of the viewpoint setting unit 11, the display processing unit 12, the map DB 21 and the display device 22 in the first embodiment, which are shown in FIG. 1, and accordingly, the same reference numerals are assigned thereto, and a common description is omitted.

The map display system 2 of this embodiment is realized by a navigation device mounted on a vehicle. The GPS sensor 31, the vehicle speed sensor 32, the gyro sensor 33 and the display device 22 are mounted on the vehicle together with the map display system 2. In the following description, the vehicle on which the map display system 2, the GPS sensor 31, the vehicle speed sensor 32, the gyro sensor 33 and the display device 22 are mounted is referred to as an "own vehicle" in some case.

The GPS sensor 31 receives a radio signal transmitted from a GPS satellite, and detects a current position of the own vehicle based on the received radio signal. The GPS sensor 31 gives current position information, which represents the detected current position of the own vehicle, to the map display system 2, and specifically, the position information acquiring unit 14 and map drawing unit 10 of the map display system 2.

The vehicle speed sensor 32 detects a running speed (hereinafter, referred to as a "vehicle speed" in some case) of the own vehicle. The vehicle speed sensor 32 gives vehicle speed information, which represents the detected vehicle speed, and specifically, a vehicle speed pulse signal to the map display system 2, and specifically, the position information acquiring unit 14 and map drawing unit 10 of the map display system 2.

The gyro sensor 33 is an angular velocity sensor, and detects an angular velocity of the own vehicle. The gyro sensor 33 generates angular velocity information, which represents the detected angular velocity of the own vehicle, and gives the generated angular velocity information to the map display system 2, and specifically, the position information acquiring unit 14 and map drawing unit 10 of the map display system 2.

The timer unit 13 measures a relative time elapsed. For example, the timer unit 13 is realized by a counter that counts an elapsed time from a point of time when a time count is started.

In this embodiment, the map display system 2 is configured to acquire map information from the map DB 21; however, is not limited to such a configuration. The map display system 2 may be configured to acquire a whole or part of the map information from an outside of the own vehicle, for example, by communications. Specifically, the map display system 2 may be configured to acquire the map information by downloading the map information from an external server device of the own vehicle through a communication network such as the Internet. The acquired map information is given to the position information acquiring unit 14 and the map drawing unit 10.

The position information acquiring unit 14 and the map drawing unit 10 individually acquire the current position information, which is outputted from the GPS sensor 31, the vehicle speed information, which is outputted from the vehicle speed sensor 32, and the angular velocity information, which is outputted from the gyro sensor 33, through an onboard network such as an in-vehicle LAN (Local Area Network) (not shown).

The position information acquiring unit 14 obtains a point (hereinafter, referred to as an "own vehicle point" in some case), at which the own vehicle is present on the map, based on the current position information given from the GPS sensor 31, on the vehicle speed information given from the vehicle speed sensor 32, and on the angular velocity information given from the gyro sensor 33. The position information acquiring unit 14 generates own vehicle point information that represents the obtained own vehicle point.

Moreover, the position information acquiring unit 14 acquires road attribute information, which is included in the map information, from the map DB 21. The position information acquiring unit 14 collates the generated own vehicle point information and the road attribute information, which is acquired from the map DB 21, with each other, and detects a road on which the own vehicle point is present. The position information acquiring unit 14 generates own vehicle point road information, which represents the detected road, and gives the generated own vehicle point road information to the map drawing unit 10.

The map drawing unit 10 acquires the road attribute information, which is included in the map information, from the map DB 21. The road attribute information includes a tunnel flag, which represents whether or not the road represented by the road attribute information concerned is a tunnel. The map drawing unit 10, and specifically, the viewpoint setting unit 11 determines whether or not the road on which the own vehicle position is present is the tunnel by using the tunnel flag included in the road attribute information.

In a case where the own vehicle runs through the tunnel, the viewpoint setting unit 11 calculates a viewpoint position as will be described later, and combines the calculated viewpoint position as a viewpoint position of a background map generated by the display processing unit 12, and outputs the combined viewpoint position to the display device 22.

Figure 3:
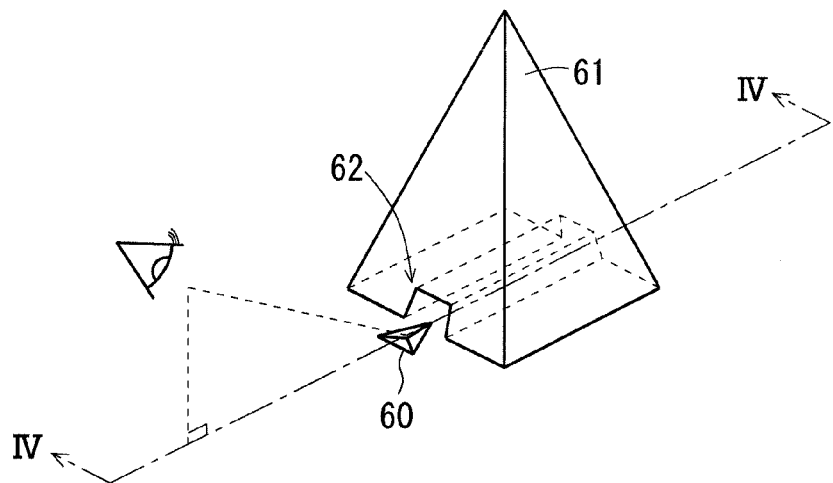
FIG. 3 is a view explaining a viewpoint position in a case where an own vehicle 60 runs through a tunnel 62 formed in a mountain 61.
Figure 4:
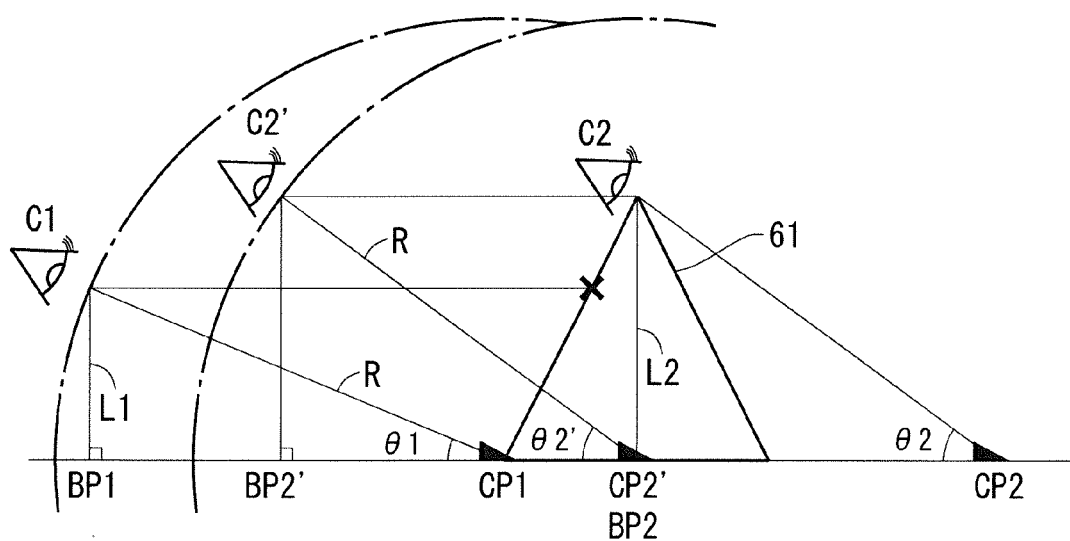
FIG. 4 is a cross-sectional view viewed from a cut surface line IV-IV of FIG. 3.

FIG. 3 is a view for explaining a viewpoint position in a case where an own vehicle 60 runs through a tunnel 62 formed in a mountain 61. FIG. 4 is a cross-sectional view viewed from a cut surface line IV-IV of FIG. 3.

A position before the own vehicle 60 enters the tunnel 62 is shown by "CP1", a position while the own vehicle 60 is running through the tunnel 62 is shown by "CP2'", and a position after the own vehicle 60 goes through the tunnel 62 is shown by "CP2". Moreover, positions (hereinafter, referred to as "reference positions" in some case), which serve as references in a horizontal direction of respective viewpoint positions C1, C2' and C2, are shown by "BP1", "BP2'" and "BP2".

In a case where the own vehicle 60 is located at the position CP1 before entering the tunnel 62, the viewpoint position is located at a position (hereinafter, referred to as a "standard viewpoint position" in some case) C1 predetermined as a standard viewpoint position, and the viewpoint does not enter a landform polygon (hereinafter, referred to as a "landform polygon 61" in some case) that represents the mountain 61. As the own vehicle 60 is moving in a traveling direction, that is, to a right side of FIG. 4, the viewpoint position finally collides with the landform polygon 61.

In order to avoid this collision, for example, data of a height (hereinafter, referred to as an "altitude" in some case) of the landform polygon 61 on the own vehicle position CP2' in the tunnel 62 is referred to from the map information. Then, in a case where a height L2 of the landform polygon 61 is higher than a height L1 of a standard viewpoint position C1, then there is calculated an angle (hereinafter, referred to as a "viewpoint angle" in some case) θ2' from a horizontal plane to the viewpoint position in a case where the viewpoint position reaches a height of not colliding with the landform polygon 61, for example, a case where the viewpoint position becomes C2'.

The viewpoint angle θ2' at the viewpoint position C2' is calculated as a value at a time when the own vehicle 60 is located at the own vehicle position CP2' in the tunnel 62, and timing of changing the viewpoint angle θ1 at the own vehicle position CP1 to the viewpoint angle θ2' at the own vehicle position CP2' in the tunnel 62 is a point of time when the reference position serving as a reference of the viewpoint position reaches BP2, and a viewpoint position at that time is shown by "C2".

Moreover, in this case, the viewpoint positions before the change and after the chance are placed on a circumference with the same radius, and accordingly, a distance R between the viewpoint position and the own vehicle position is not changed. That is to say, the viewpoint is set so as to maintain a relative distance with respect to the own vehicle 60.

FIG. 5 is a view for explaining a viewpoint position in a case where the own vehicle 60 runs through the tunnel formed in a mountain 63. In FIG. 5, such a position before the own vehicle 60 enters the tunnel is shown by "CP3", and a position while the own vehicle 60 is running through the tunnel is shown by "CP4". Moreover, places serving as references of respective viewpoint positions C3 and C3' are shown by "BP3" and "BP4".

In a similar way to the above-mentioned case shown in FIG. 3 and FIG. 4, also in the example shown in FIG. 5, at the viewpoint position C3, there is no problem in a case where the own vehicle 60 is present at the CP3; however, as the own vehicle 60 is moving in the traveling direction, that is to a right side of FIG. 5, the viewpoint position finally collides with a landform polygon (hereinafter, referred to as a "landform polygon 63") that represents the mountain 63.

Unlike the example shown in FIG. 3, in the example shown in FIG. 5, even if the viewpoint angle is changed to 90°, that is, to a viewpoint angle at the viewpoint position C3' as a state of looking down from right above, the collision with the landform polygon 63 cannot be avoided.

There is a case where the collision cannot be avoided even if the viewpoint angle is increased in order to avoid the collision. For example, in a case where the own vehicle 60 is present at an own vehicle position CP4, the collision with the landform polygon 63 cannot be avoided even if the viewpoint angle is set to 90°. That is to say, the viewpoint cannot be set at a position higher than an altitude of a landform present at a position on the map, which is located above the own vehicle 60, and corresponds to the current position of the own vehicle 60 while maintaining the relative distance with respect to the current position of the own vehicle 60, which is sequentially updated.

In this case, in order to avoid the collision with the landform polygon 63, the viewpoint angle is set to 90°, and a distance L3 (=R) between the viewpoint position C3' and the own vehicle position CP3 is extended to L4, and the viewpoint position is set at a position C4 at which the viewpoint position does not collide with the landform polygon 63.

As described above, if the relative distance between the viewpoint position and the own vehicle position that is a current position of a mobile body, that is, a relative distance (hereinafter, referred to as a "viewpoint distance" in some case) of the viewpoint with respect to the current position of the mobile body is changed, and for example, becomes long, then on the map, a map display object such as an own vehicle symbol that represents the own vehicle 60 becomes small to deteriorate visibility thereof in some case.

In order to avoid such a deterioration of the visibility, in this embodiment, in order that the map display object can be displayed with a same size as that before the viewpoint distance is changed, the map display object is magnified by power as a coefficient of extending such an original viewpoint distance, that is, power of L4/L3 in the example shown in FIG. 5, followed by display.

When the change of the viewpoint position, which is as described above, is executed when the own vehicle is running through a tunnel located on a landform with a sudden height difference, an apparent flicker of the map occurs following the frequent change of the viewpoint position in some case. In order to suppress this frequent change of the viewpoint position, in this embodiment, a threshold value is set for duration of such tunnel running in the landform for which the change of the viewpoint position is necessary, and a change of the viewpoint position, which is performed in a short time, is suppressed.

Figure 6:
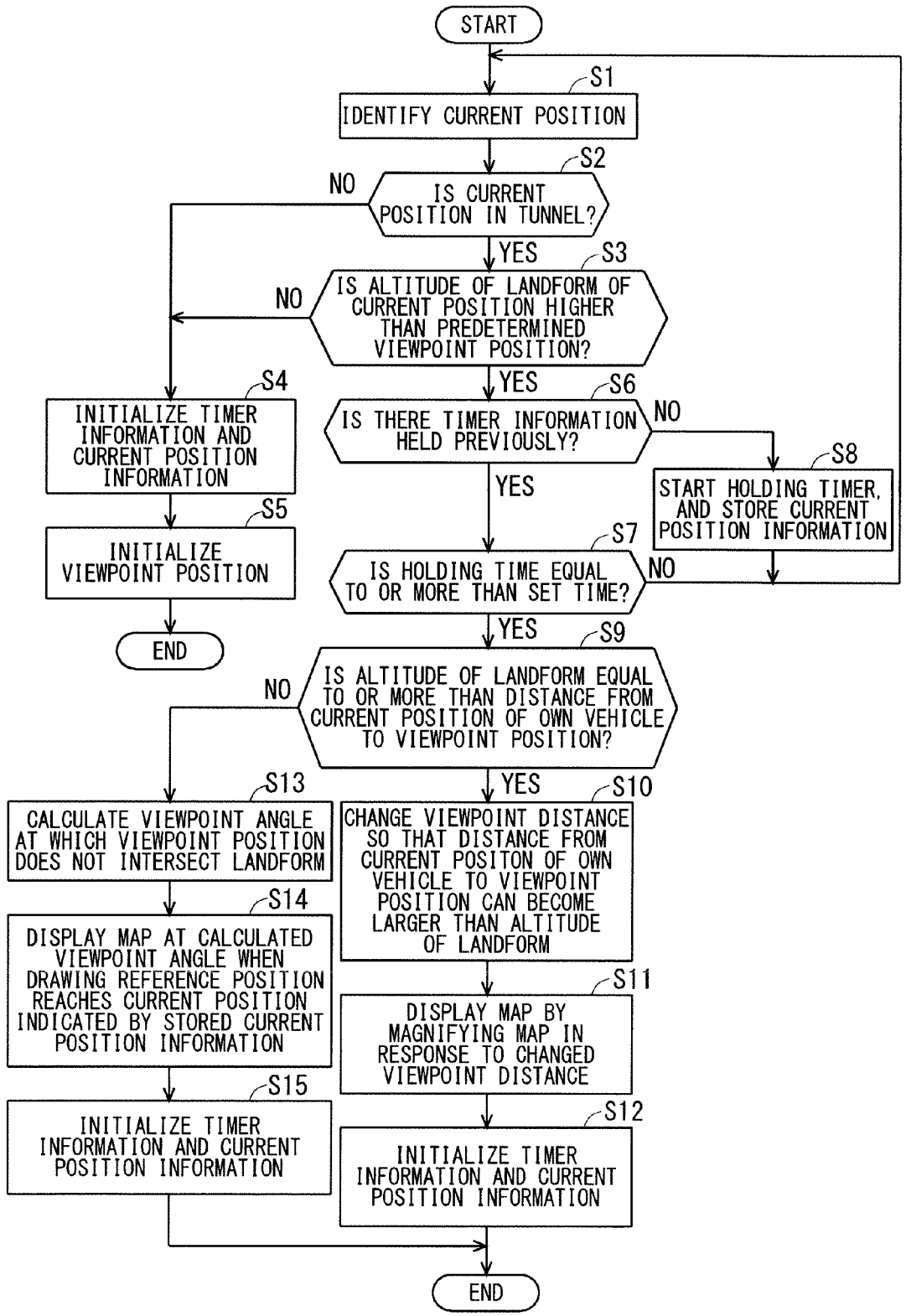
FIG. 6 is a flowchart showing a procedure of changing processing for a viewpoint position in the second embodiment of the present invention.

FIG. 6 is a flowchart showing a procedure of such changing processing for the viewpoint position in the second embodiment of the present invention. The processing in each step of the flowchart shown in FIG. 6 is executed by the position information acquiring unit 14 and the map drawing unit 10, which compose the map display system 2 shown in FIG. 2. The processing of the flowchart shown in FIG. 6 is started when the current position information updated following the movement of the own vehicle 60 is inputted to the map display system 2, and the processing shifts to Step S1.

In Step S1, the position information acquiring unit 14 identifies the current position. Specifically, the position information acquiring unit 14 obtains the own vehicle point on the map based on the current position information given from the GPS sensor 31, on the vehicle speed information given from the vehicle speed sensor 32, and on the angular velocity information given from the gyro sensor 33, and thereby identifies the current position of the own vehicle 60. The position information acquiring unit 14 generates own vehicle point information that represents the obtained own vehicle point.

Moreover, the position information acquiring unit 14 acquires the road attribute information from the map DB 21, compares the own vehicle point information generated in Step S1 and the road attribute information acquired from the map DB 21 with each other, and detects the road on which the own vehicle point is present. The position information acquiring unit 14 generates the own vehicle point road information, which represents the detected road, and gives the generated own vehicle point road information to the map drawing unit 10.

In Step S2, the map drawing unit 10 determines whether or not the current position is in the tunnel. Specifically, the map drawing unit 10 acquires the road attribute information from the map DB 21, and determines whether or not the current position of the own vehicle 60 is in the tunnel by using the tunnel flag included in the acquired road attribute information. In a case where it is determined that the current position is in the tunnel, then the processing shifts to Step S3, and in a case where it is determined that the current position is not in the tunnel, then the processing shifts to Step S4.

In Step S3, the map drawing unit 10 determines whether or not the altitude of the landform of the current position is higher than the standard viewpoint position that is a predetermined viewpoint position. Specifically, the map drawing unit 10 acquires the altitude information from the map DB 21, and based on the acquired altitude information, determines whether or not the altitude of the landform of the current position is higher than the standard viewpoint position. In a case where it is determined that the altitude of the landform of the current position is higher than the standard viewpoint position, then the processing shifts to Step S6, and in a case where it is determined that the altitude of the landform of the current position is not higher than the standard viewpoint position, that is, is equal to or less than the altitude of the standard viewpoint position, then the processing shifts to Step S4.

In Step S4, the map drawing unit 10 initializes timer information and the current position information. Subsequently, in Step S5, the map drawing unit 10 initializes the viewpoint position. When the processing of Step S5 is ended, the processing procedure is entirely ended.

In Step S6, the timer unit 13 determines whether or not there is timer information held previously. In a case where it is determined that there is timer information held previously, then the processing shifts to Step S7, and in a case where it is determined that there is not timer information held previously, then the processing shifts to Step S8.

In Step S7, the timer unit 13 determines whether or not a holding time of the timer information is equal to or more than the set time that is predetermined. In a case where it is determined that the holding time of the timer information is equal to or more than the set time, then the processing shifts to Step S9, and in a case where it is determined that the holding time of the timer information is not equal to or more than the set time, that is, is less than the set time, then the processing returns to Step S1.

In Step S8, the map drawing unit 10 starts to measure the holding time of a holding timer, that is, of the timer information by the timer unit 13, and stores the current position information at that time in a memory (not shown). When the processing of Step S8 is ended, the processing returns to Step S1.

In Step S9, the viewpoint setting unit 11 determines whether or not the altitude of the landform is equal to or more than the distance from the current position of the own vehicle to the viewpoint position. In a case where it is determined that the altitude of the landform is equal to or more than the distance from the current position of the own vehicle to the viewpoint position, then the processing shifts to Step S10, and in a case where it is determined that the altitude of the landform is not equal to or more than the distance from the current position of the own vehicle to the viewpoint position, then the processing shifts to Step S13.

In Step S10, the viewpoint setting unit 11 changes the viewpoint distance so that the distance from the current position of the own vehicle to the viewpoint position can become larger than the altitude of the landform. When the processing of Step S10 is ended, the processing shifts to Step S11.

In Step S11, the display processing unit 12 magnifies the map in response to the changed viewpoint distance, followed by display. Specifically, the display processing unit 12 generates the display data so as to display the map by magnifying the map in response to the changed viewpoint distance, gives the generated display data to the display device 22, and allows the display device 22 to magnify and display the map. When the processing of Step S11 is ended, the processing shifts to Step S12.

In Step S12, the map drawing unit 10 initializes the timer information and the current position information. When the processing of Step S12 is ended, the processing procedure is entirely ended.

In Step S13, as shown in FIG. 3 and FIG. 4, which are mentioned above, the viewpoint setting unit 11 calculates a viewpoint angle at which the viewpoint position does not intersect the landform. When the processing of Step S13 is ended, the processing shifts to Step S14.

In Step S14, when a drawing reference position reaches the current position indicated by the stored current position information, the display processing unit 12 gives the display data to the display device 22, and thereby displays the map at the calculated viewpoint angle. When the processing of Step S14 is ended, the processing shifts to Step S15.

In Step S15, the map drawing unit 10 initializes the timer information and the current position information. When the processing of Step S15 is ended, the processing procedure is entirely ended.

The position of the viewpoint, which is changed as described above, is returned to an original thereof when the own vehicle 60 passes through the reference position BP2.

As described above, according to this embodiment, in a similar way to the first embodiment, in the case where the altitude information is present in the map DB 21 at the position on the map, which is set in response to the position indicated by the inputted position information, the viewpoint setting unit 11 changes the sight direction of the viewpoint, and thereby sets the viewpoint at the position higher than the altitude of the map constituent such as the landform at the position on the map.

In such a way, for example, in the case where the own vehicle 60 passes through the tunnel in the landform higher than the viewpoint position, for example, the mountain, then the viewpoint can be prevented from entering the map constituent representing the mountain or the like. Hence, an unnecessary image in an inside of the map constituent called a polygon representing the landform or the like can be prevented from being displayed, and accordingly, a map with a good appearance can be displayed on the display device 22.

Moreover, in this embodiment, the position indicated by the position information inputted to the map display system 2 is the current position of the mobile body such as the own vehicle 60. Every time when the current position information updated following the movement of the mobile body such as the own vehicle 60 is inputted to the map display system 2, the viewpoint setting unit 11 performs the setting of the viewpoint. In such a way, the viewpoint can be set at an appropriate position corresponding to the current position. Hence, the unnecessary image in the inside of the polygon can be prevented more surely from being displayed, and accordingly, the map with a good appearance can be displayed on the display device 22 more surely.

Moreover, in this embodiment, as shown in FIG. 4, the viewpoint setting unit 11 sets the viewpoint so as to maintain the relative distance with respect to the sequentially updated current position of the mobile body such as the own vehicle 60. In such a way, the map display object such as the own vehicle symbol that represents the own vehicle 60 can be prevented from being displayed to be small on the map, and accordingly, the deterioration of the visibility can be avoided.

Moreover, in this embodiment, as shown in FIG. 5, in the case where the viewpoint setting unit 11 cannot set the viewpoint at the position higher than the altitude of the landform, which is indicated by the altitude information of the position on the map, the position corresponding to the current position of the mobile body, by changing the sight direction of the viewpoint to the sequentially updated current position of the mobile body such as the own vehicle 60, then the viewpoint setting unit 11 sets the viewpoint at the position higher than the altitude of the landform by changing the relative distance with respect to the current position of the mobile body. In such a way, the unnecessary image in the inside of the polygon can be prevented more surely from being displayed, and the map with a good appearance can be displayed on the display device 22 more surely.

Moreover, in this embodiment, in the case where the viewpoint setting unit 11 changes the viewpoint distance that is the relative distance to the current position of the mobile body, the display processing unit 12 magnifies or reduces the map so that scales of the mobile body and the map cannot be changed following the change of the viewpoint distance, and then generates the display data. Specifically, in order that the map display object can be displayed with the same size as before the viewpoint distance is changed, the display data is generated so that the map display object can be magnified by the power as the coefficient of extending the original viewpoint distance, that is, the power of L4/L3 in the example shown in FIG. 5, followed by display. In such a way, the map display object such as the own vehicle symbol that represents the own vehicle 60 can be prevented from being displayed to be small on the map, and the deterioration of the visibility can be avoided.

Moreover, in this embodiment, as shown in FIG. 6, in the case where it is determined in Step S7 that the holding time is equal to or more than the set time, the viewpoint setting unit 11 performs the setting of the viewpoint. That is to say, in a case where a time interval at which the position information updated following the movement of the mobile body is inputted is equal to or less than the set time, the viewpoint setting unit 11 does not change the setting of the viewpoint. In such a way, the frequent change of the viewpoint position can be suppressed, and the occurrence of the apparent flicker of the map can be suppressed.

Moreover, in this embodiment, the processing of the flowchart shown in FIG. 6 is started when the current position information updated following the movement of the own vehicle 60 is inputted to the map display system 2. That is to say, in the case where the movement of the mobile body such as the own vehicle 60 is stopped, and the updated current position information is not inputted, the viewpoint setting unit 11 does not change the setting of the viewpoint. In such a way, the frequent change of the viewpoint position can be suppressed, and the occurrence of the apparent flicker of the map can be suppressed.

Moreover, in this embodiment, as shown in FIG. 3 to FIG. 5, with regard to the landform as the mountain 61 or 63 in a mountainous area, which includes the tunnel 62 along the road through which the mobile body such as the own vehicle 60 passes, in the case where there is a road on the map, which corresponds to the current position of the mobile body, in the tunnel 62, then the setting of the viewpoint is performed by the viewpoint setting unit 11. In such a way, the unnecessary image in the inside of the mountain 61 or 63 can be prevented from being displayed, and the map with a good appearance can be displayed on the display device 22.

<Third Embodiment>

Figure 7:
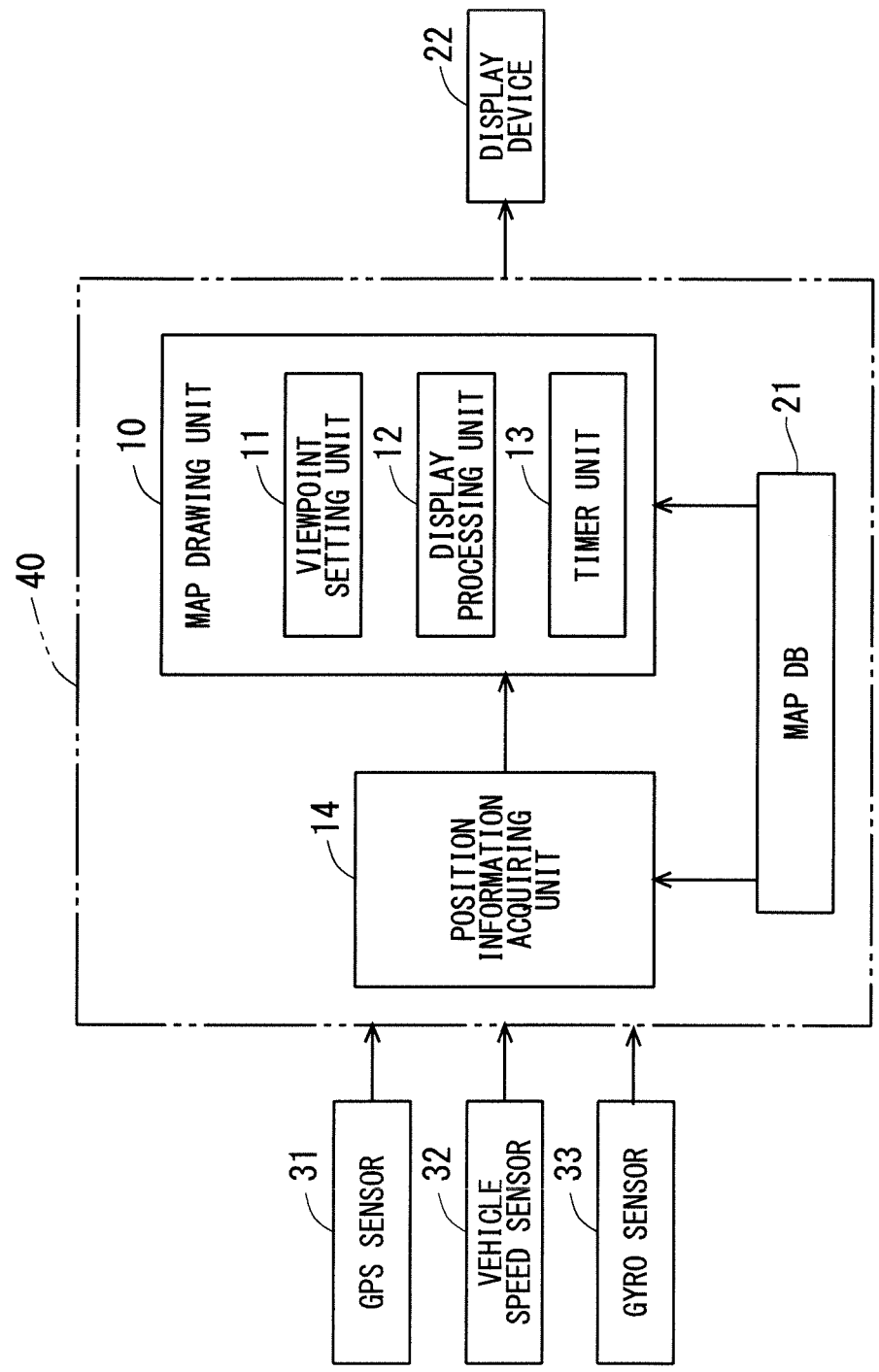
FIG. 7 is a block diagram showing a configuration of a map display system 40 as a third embodiment of the present invention.

FIG. 7 is a block diagram showing a configuration of a map display system 40 as a third embodiment of the present invention. The map display system 40 of this embodiment is similar in configuration to the map display system 2 of the above-mentioned second embodiment, and accordingly, the same reference numerals are assigned to the same constituents, and a common description is omitted.

The map display system 40 of this embodiment is realized by a server device. The server device that is the map display system 40 includes a position information acquiring unit 14, a map drawing unit 10, and a map DB 21. In this embodiment, the GPS sensor 31, the vehicle speed sensor 32, the gyro sensor 33 and the display device 22 are mounted on a vehicle. In this embodiment, the vehicle, on which the GPS sensor 31, the vehicle speed sensor 32, the gyro sensor 33 and the display device 22 are mounted, corresponds to the "own vehicle" in the above-mentioned first embodiment.

The vehicle, on which these GPS sensor 31, vehicle speed sensor 32, gyro sensor 33 and display device 22 are mounted, and the server device that is the map display system 40 are connected to each other via a communication network, for example, such as the Internet so as to be capable of radio communication therebetween. From the vehicle via the communication network, the server device that is the map display system 40 acquires current position information outputted from the GPS sensor 31, vehicle speed information outputted from the vehicle speed sensor 32, and angular velocity information outputted from the gyro sensor 33.

Even in a case where the map display system 40 is realized by the server device as described above, similar effects to those of the above-mentioned second embodiment can be obtained.

<Fourth Embodiment>

Figure 8:
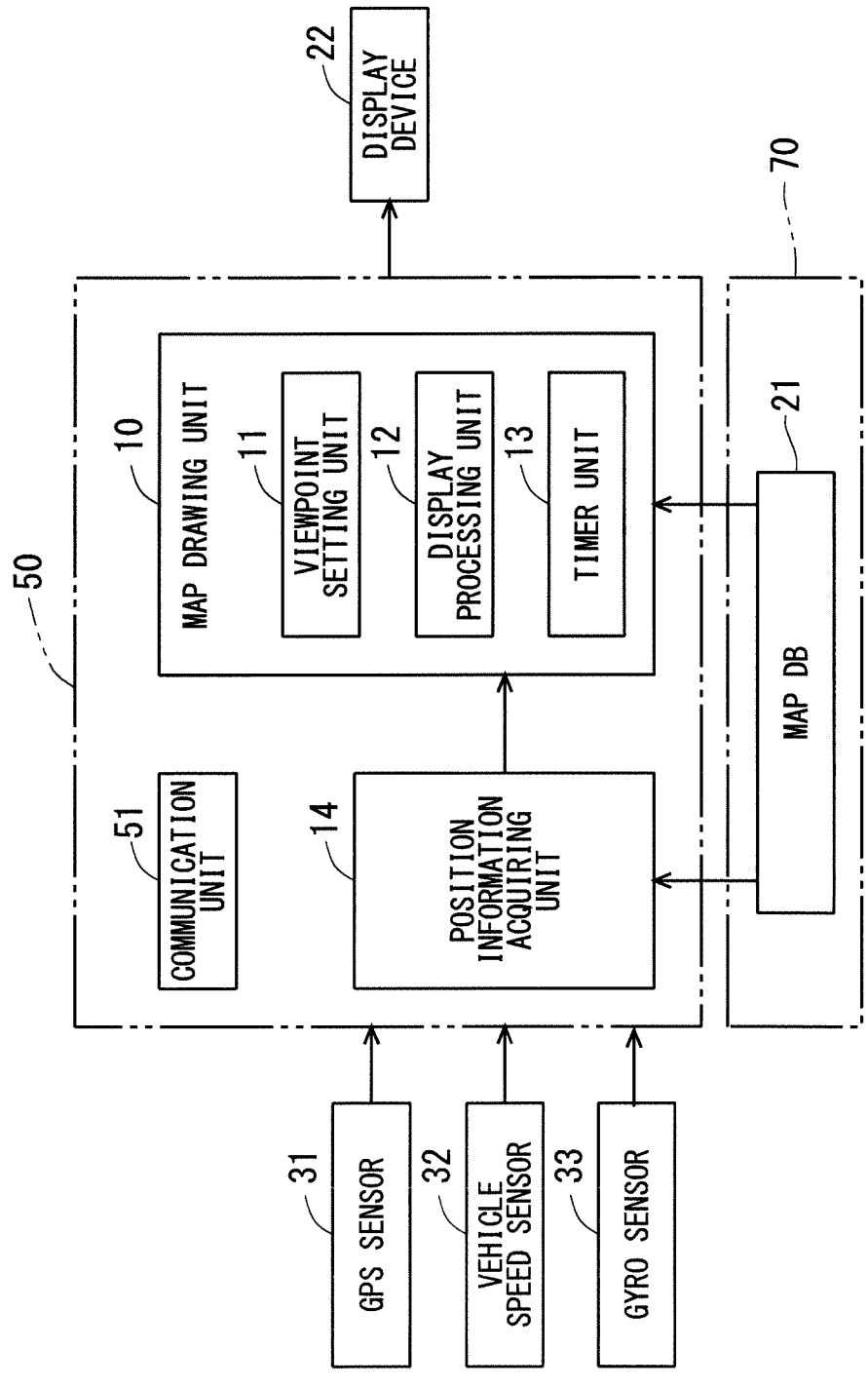
FIG. 8 is a block diagram showing a configuration of a map display system 50 as a fourth embodiment of the present invention.

FIG. 8 is a block diagram showing a configuration of a map display system 50 as a fourth embodiment of the present invention. The map display system 50 of this embodiment is similar in configuration to the map display system 2 of the above-mentioned second embodiment, and accordingly, the same reference numerals are assigned to the same constituents, and a common description is omitted.

The map display system 50 of this embodiment is realized by a portable communication device. The portable communication device is, for example, a cellular phone, a smart phone or a tablet-type terminal device. The portable communication device that is the map display system 50 includes a position information acquiring unit 14, a map drawing unit 10, and a communication unit 51. The communication unit 51 is configured to be communicable with external devices, for example, a server device 70 and a display device 22.

In this embodiment, the GPS sensor 31, the vehicle speed sensor 32, the gyro sensor 33 and the display device 22 are mounted on a vehicle. In this embodiment, the vehicle, on which the GPS sensor 31, the vehicle speed sensor 32, the gyro sensor 33 and the display device 22 are mounted, corresponds to the "own vehicle in the above-mentioned first embodiment.

The vehicle, on which these GPS sensor 31, vehicle speed sensor 32, gyro sensor 33 and display device 22 are mounted, and the portable communication device that is the map display system 50 are connected to each other via a base station so as to be capable of radio communication therebetween. From the vehicle via the base station, the portable communication device that is the map display system 50 acquires current position information outputted from the GPS sensor 31, vehicle speed information outputted from the vehicle speed sensor 32, and angular velocity information outputted from the gyro sensor 33.

The portable communication device that is the map display system 50 and the server device 70 are configured to be communicable with each other via the communication network such as the Internet. The server device 70 includes a map DB 21. The map display system 50 of this embodiments acquires map information from the map DB 21 of the server device 70 via the communication network such as the Internet.

Even in a case where the map display system 50 is realized by the portable communication device as described above, similar effects to those of the above-mentioned second embodiment can be obtained.

Note that, in the present invention, it is possible to freely combine the respective embodiments with one another within the scope of the invention. Moreover, it is possible to appropriately change or omit any constituent of the respective embodiments.

Although the present invention has been described in detail, the above description is illustration in all aspects, and the present invention is not limited to this. It is interpreted that innumerable modification examples, which are not illustrated, are conceivable without departing from the scope of the present invention.

REFERENCE SIGNS LIST

1, 2, 40, 50: MAP DISPLAY SYSTEM
10: MAP DRAWING UNIT
11: VIEWPOINT SETTING UNIT
12: DISPLAY PROCESSING UNIT
13: TIMER UNIT
14: POSITION INFORMATION ACQUIRING UNIT
21: MAP DB
22: DISPLAY DEVICE
31: GPS SENSOR
32: VEHICLE SPEED SENSOR
33: GYRO SENSOR
51: COMMUNICATION UNIT
70: SERVER DEVICE

The invention claimed is:

1. A map display system comprising:
a processor to execute a program; and
a memory to store the program which, when executed by the processor, results in performance of steps comprising,
acquiring, from a map database, map information of a set region set in response to a position indicated by inputted position information,
setting, based on said acquired map information, a viewpoint of viewing a ground surface on a map of said set region at a time of displaying said map, and
generating display data for displaying, on a display device, a map of said set region in a case of viewing the ground surface from the viewpoint set in said setting, wherein
said map database stores altitude information indicating an altitude of a landform present in at least a partial region of said set region, and
in said setting:
where said altitude information is present in said map database at a position on the map, the position being set in response to the position indicated by said inputted position information, a sight direction of said viewpoint is changed in view of the landform being at a higher altitude than the set viewpoint, and said viewpoint is thereby set at a position higher than the altitude of said landform, preventing an unnecessary image of the inside of the landform from being displayed, with the altitude being indicated by said altitude information at the position on said map.

2. The map display system according to claim 1, wherein the position indicated by said inputted position information is a current position of a mobile body, and
said setting of said viewpoint is performed every time of receiving said position information updated following movement of said mobile body.

3. The map display system according to claim 2, wherein said setting of said viewpoint is performed so as to maintain a relative distance with respect to the sequentially updated current position of said mobile body.

4. The map display system according to claim 2, wherein in said setting:
where said viewpoint cannot be set at the position higher than the altitude of said landform, the altitude being indicated by said altitude information of the position on the map, the position corresponding to the current position of said mobile body, by changing the sight direction of said viewpoint to the sequentially updated current position of said mobile body, then a relative distance with respect to the current position of said mobile body is changed, and said viewpoint is thereby set at the position higher than the altitude of said landform.

5. The map display system according to claim 4, wherein in said generating:
where the relative distance with respect to the current position of said mobile body is changed, said map is magnified or reduced to generate said display data so that scales of said mobile body and said map cannot be changed following the change of said relative distance.

6. The map display system according to claim 2, wherein said setting of said viewpoint is not changed where a time interval at which said position information updated following the movement of said mobile body is equal to or less than a predetermined set time.

7. The map display system according to claim 2, wherein said setting of said viewpoint is not changed where the movement of said mobile body is stopped, and said updated position information is not inputted.

8. The map display system according to claim 2, wherein said landform includes a landform as a mountain in a mountainous area, the mountain including a tunnel along a road through which said mobile body passes, and said setting of said viewpoint is performed where said road is present in said tunnel at a position on the map, the position corresponding to the current position of said mobile body.

9. A map display method comprising: acquiring, from a map database, map information of a set region set in response to a position indicated by inputted position information; setting, based on said acquired map information, a viewpoint of viewing a ground surface on a map of said set region at a time of displaying said map; and generating display data for displaying, on a display device, a map of said set region in a case of viewing the ground surface from said set viewpoint, wherein in said map database, altitude information indicating an altitude of a landform present in at least a partial region of said set region is stored, and where said altitude information is present in said map database at a position on the map, the position being set in response to the position indicated by said inputted position information, a sight direction of said viewpoint is changed in view of the landform being at a higher altitude than the set viewpoint, and said viewpoint is thereby set at a position higher than the altitude of said landform, preventing an unnecessary image of the inside of the landform from being displayed, with the altitude being indicated by said altitude information at the position on said map.

\* \* \* \* \*